United States Patent [19]
Royce et al.

[11] Patent Number: 5,650,094
[45] Date of Patent: Jul. 22, 1997

[54] RED EMITTING LONG DECAY PHOSPHORS

[76] Inventors: Martin R. Royce, 1938 Crooked Oak Dr.; Shinya Matsuda, 1073 Olde Hickory Rd., both of Lancaster, Pa. 17601; Hiroto Tamaki, 654 Ohara Nalcashima Nakagawa-cho Naka-Gun, Tokushima, Japan

[21] Appl. No.: 466,570

[22] Filed: Jun. 6, 1995

[51] Int. Cl.$^6$ .................................................. C09K 11/00
[52] U.S. Cl. ............................ 252/301.4 F; 252/301.6 F; 252/301.6 R; 252/301.4 R
[58] Field of Search ............... 252/301.4 R, 301.4 F, 252/301.6 R, 301.6 F

[56] References Cited

U.S. PATENT DOCUMENTS 3,728,594  4/1973  Yim et al. .................. 252/301.4 R
5,376,303  12/1994  Royce et al. .................. 252/201.4 R

FOREIGN PATENT DOCUMENTS 0622440  2/1994  European Pat. Off. .
1158222  7/1969  United Kingdom .

OTHER PUBLICATIONS

Keller et al., "Optical Spectra of Rare Earth Activated BaTiO$_3$", The Journal of Chemical Physics, vol. 31, No. 5, 1272–1277 (1959) Nov.

Makishima, et al., "Luminescence of Sm$^{3+}$ in BaTiO$_3$ Matrix", J. Phys. Chem. Solids, vol. 23, pp. 749–757, (1962). no month.

Grabner et al., "Photoluminescence of Cr–Doped CaTiO$_3$", Physical Review, vol. 2, No. 11, 4351–4353 (1970). Dec.

*Primary Examiner*—Melissa Bonner
*Attorney, Agent, or Firm*—Kenyon & Kenyon

[57] ABSTRACT

Long decay phosphors are disclosed that are comprised of rare-earth activated divalent titanates. In particular, the long decay phosphors are comprised of $$(Ca_{(1-a-b)}Pr_aM_b)O \cdot TiO_2$$

wherein
0.00001 ≦ a ≦ 0.1 and
0.0 ≦ b ≦ 0.3
and M is Zn and/or Mg.

43 Claims, 6 Drawing Sheets

RED EMITTING LONG DECAY PHOSPHORS

FIELD OF INVENTION

This invention relates to red emitting long decay phosphors comprised of praseodymium-activated calcium titanates that may include the divalent metal elements Zn and/or Mg, which partially substitute for the Ca.

BACKGROUND OF THE INVENTION

Luminescent materials having long decay periods ranging from a few minutes to several hours are known and typically produce their radiation by phosphorescence. Such phosphorescent materials have typically been used in safety signs or on watch or clock dials. In recent years, technology has developed which make it possible to imbed luminescent materials in pressed or molded plastic products. Such technology significantly broadens the range of long decay phosphor applications.

Copper-activated zinc sulfide, such as ZnS:Cu,Cl, is frequently used for these long decay phosphor applications because copper-activated zinc sulfide produces emission in a spectral region having a relatively high luminous efficiency. However, the properties of copper-activated zinc sulfide are not completely satisfactory since the brightness of the phosphor falls off substantially after extended decay periods, such that the emission is barely perceptible after about 30 minutes. Furthermore, copper-activated zinc sulfide is subject to degradation and deterioration when exposed to UV radiation in a moist or humid atmosphere. The body color of the material containing the zinc sulfide darkens, possibly due to the presence of elemental zinc on the surface. Use of such materials for outdoor applications has, therefore, been severely limited.

Phosphorescent materials having a long decay period may be used in such fields as the graphic arts, interior decorating or printing inks. For these applications, alkaline earth sulfide phosphors have been used, since they can be prepared with a broad gamut of colors ranging throughout the visible spectrum from blue to red. These materials, however, are hygroscopic and react readily with moisture tending to generate hydrogen sulfide, a noxious and toxic substance. These properties severely restrict their use in the home.

Recently, long decay phosphors comprised of rare-earth activated, divalent, boron-substituted aluminates have been developed, U.S. Pat. No. 5,376,303. These long decay phosphors overcome some of the disadvantages of ZnS:Cu, Cl and give long and bright emission in the range from blue to yellow-green. This family of phosphors is activated with divalent europium as a luminescent center. However, divalent europium has not been used to produce orange or red emission in this family of host crystals.

In the past, (Zn,Cd)S:Cu,Cl or CaS:Eu have been used for orange or red emitting long decay phosphors. However, the properties of these materials have not been satisfactory because of the above mentioned disadvantages of sulfide compounds. In particular, these sulfide materials are subject to degradation and deterioration when exposed to UV radiation in the same manner as ZnS:Cu,Cl. In addition, these materials contain the toxic element cadmium. CaS:Eu provides red emission, but this material readily reacts with moisture and tends to generate $H_2S$ gas into the atmosphere. Thus, due to the characteristics of these sulfide materials, they are troublesome and difficult to process and undesirable to use in finished products. Therefore, chemically stable and non-toxic red emitting long decay phosphors are still desired.

Divalent titanates such as strontium titanates or barium titanates are well known as dielectric substances and thermistor materials. The possibility of using divalent titanates as the host crystal for a luminescent material has also been studied. The emission of various activators in divalent titanates are reported in several studies; "Optical spectra of rare earth activated $BaTiO_3$", The Journal of Chemical Physics, Vol. 31, No.5, 1272–1277, November 1959, Seymour P. Keller and George D. Pettit; "Luminescence of $Sm^{3+}$ in $BaTiO_3$ Matrix", J. Phys. Chem., Solids Pergamon Press, Vol. 23, 749–757, 1962, S. Makishima, K. Hasegawa and S. Shionoya; and "Photoluminescence of Cr doped $CaTiO_3$", Physical Review B, Vol.2, No.11, 4351–4353, December 1970, L. Grabener and S. E. Stokowski. None of these studies disclose red emitting long decay phosphors using a divalent titanate as the host material.

ADVANTAGES AND SUMMARY OF THE INVENTION

The subject invention is directed to providing red emitting long decay phosphors with high chemical stabilities that overcome the disadvantages of prior art phosphors.

More specifically, the subject invention is directed to producing phosphorescent emission by praseodymium activation in a chemically stable calcium titanate host, wherein part of the Ca in the host material may be replaced by the divalent metal elements Zn and/or Mg.

In particular, the subject invention is achieved with a long decay phosphor comprising a composition of $(Ca_{(1-a-b)}Pr_a M_b)O \cdot TiO_2$ wherein $0.00001 \leq a \leq 0.1$ and $0 \leq b \leq 0.3$ and M is a divalent metal element selected from the group consisting of Mg, Zn and a combination thereof.

In addition, the subject invention is directed to a method for producing such long decay phosphors.

Further objects and advantages of the subject invention will be apparent to those skilled in the art from the following detailed description of the disclosed praseodymium-activated calcium titanates that may include the divalent metal elements Zn and/or Mg.

DETAILED DESCRIPTION OF THE PREFERRED EMBODIMENTS

The subject invention will now be described in detail for specific preferred embodiments of the invention, it being understood that these embodiments are intended as illustrative examples and the invention is not to be limited thereto.

The red emitting long decay phosphors of the subject invention are comprised of praseodymium-activated calcium titanates that may include the divalent metal elements Zn and/or Mg as partially substituting for the Ca, as represented by the following composition:

$$(Ca_{(1-a-b)}Pr_aM_b)O \cdot TiO_2 \qquad (I)$$

wherein $0.00001 \leq a \leq 0.1$ and $0 \leq b \leq 0.3$ and M is a divalent metal element selected from the group consisting of Mg, Zn and a combination thereof.

It is to be understood that the above formula (I) and similar formulae as disclosed herein are intended to represent the ratio of elemental constituents present in the long decay phosphor without necessarily suggesting or representing the molecular composition of the individual crystal phases present in the subject long decay phosphors.

Long decay phosphorescence is herein understood to refer to spectral emission that can be visually perceived for periods of at least several minutes and, preferably, for several hours after removal of the excitation source. The excitation source may produce excitation by electromagnetic radiation, such as x-rays, sunlight or the radiation from artificial light sources. In addition, the excitation may be provided by electron beams.

The concentration for both the luminescent center and the trapping site may be adjusted to yield the optimum decay characteristics for a given long decay phosphor. The concentration of the praseodymium that functions as a luminescent center is preferably in the range from about 0.001 to about 10.0 atom % and, more preferably, in the range from about 0.01 to about 1.0 atom % of the total calcium, praseodymium, zinc and magnesium present. The divalent metal elements zinc and/or magnesium serve as a substitute for the divalent metal element calcium and are preferably present in the range from about 0 to about 30.0 atom % of the calcium. More preferably, the zinc and/or magnesium divalent metal elements are present in the range from about 0.05 to about 20.0 atom % of the calcium.

The raw materials that are used in the preparation of the long decay phosphors of the subject invention are readily available high purity materials which preferably have a purity of at least 99.9%. More preferably, the purity is greater than 99.99%.

The raw materials that are mixed and fired to prepare the long decay phosphors of the subject invention include a component comprising calcium, a component comprising praseodymium and a component comprising titanium. The mixture of raw materials may also include a component or components comprising the divalent metal elements zinc and/ or Mg. Typically, whenever Zn and Mg are both to be present in the long decay phosphor, a component comprising Zn and a component comprising Mg are both included in the mixture of raw materials.

Figure 1:
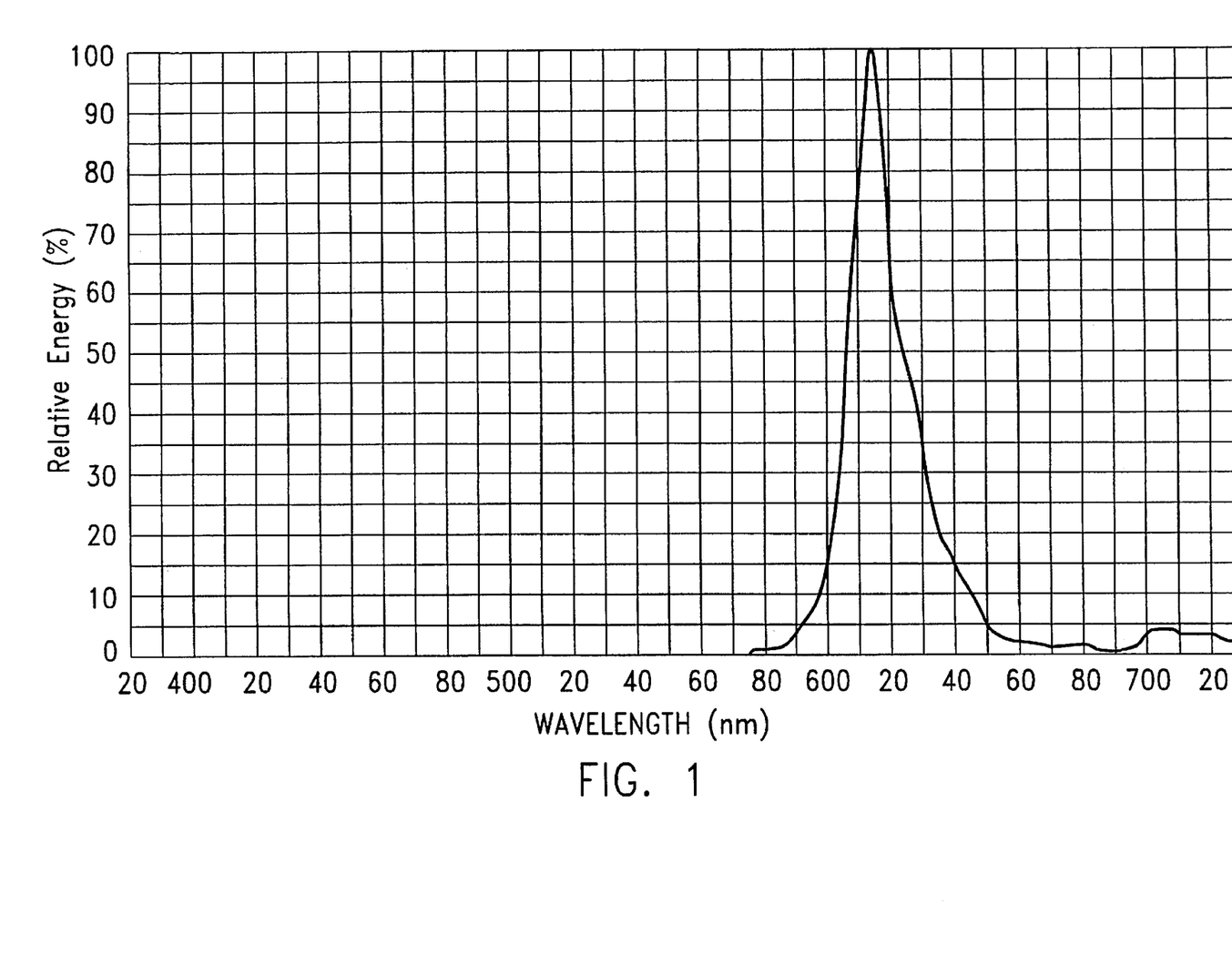
FIG. 1 shows the spectral energy distribution of the emission produced by the long decay phosphor prepared in Example 1 when excited by ultraviolet (UV) radiation at 365 nm.
Figure 2:
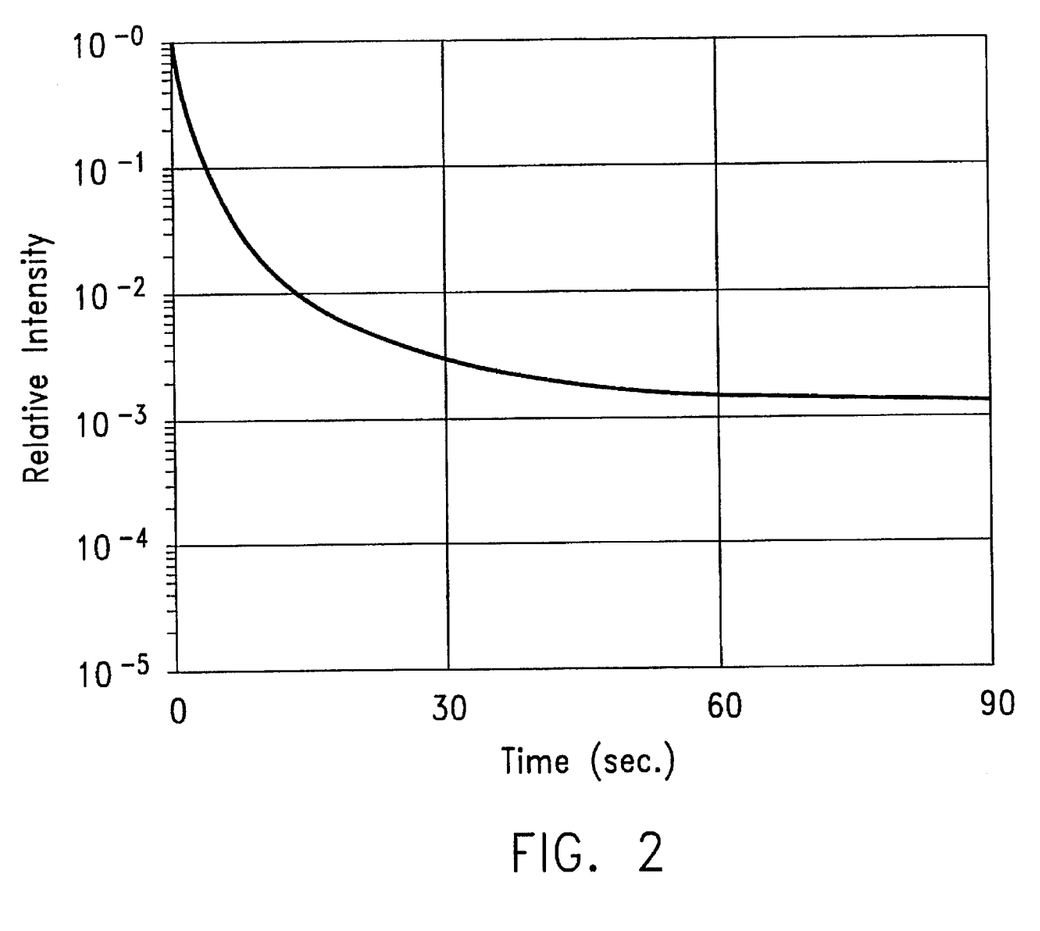
FIG. 2 shows the emission decay curve at about 614 nm for the phosphor prepared in Example 1 after 4 minutes of excitation by UV radiation at 365 nm.
Figure 3:
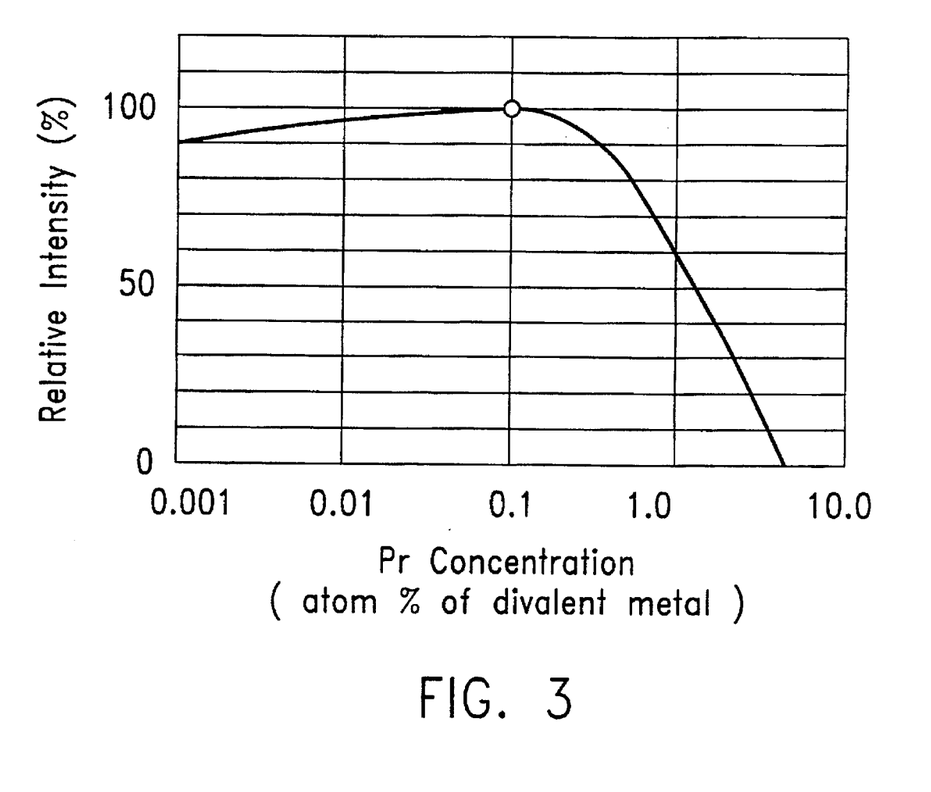
FIG. 3 shows the decay brightness as a function of praseodymium concentration for praseodymium-activated, zinc-substituted, CaTiO3 at one minute after removal of an excitation source producing UV radiation at 365 nm.
Figure 4:
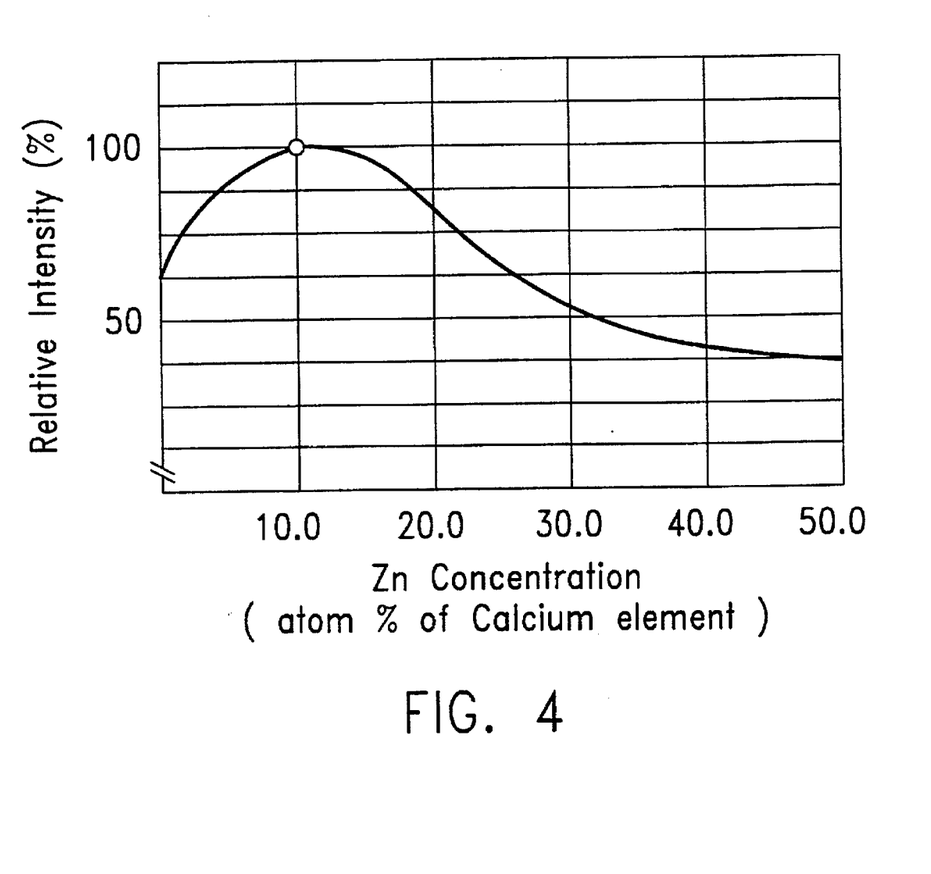
FIG. 4 shows the decay brightness as a function of zinc concentration for praseodymium-activated, zinc-substituted, CaTiO3 at one minute after removal of a 365 nm excitation source.
Figure 5:
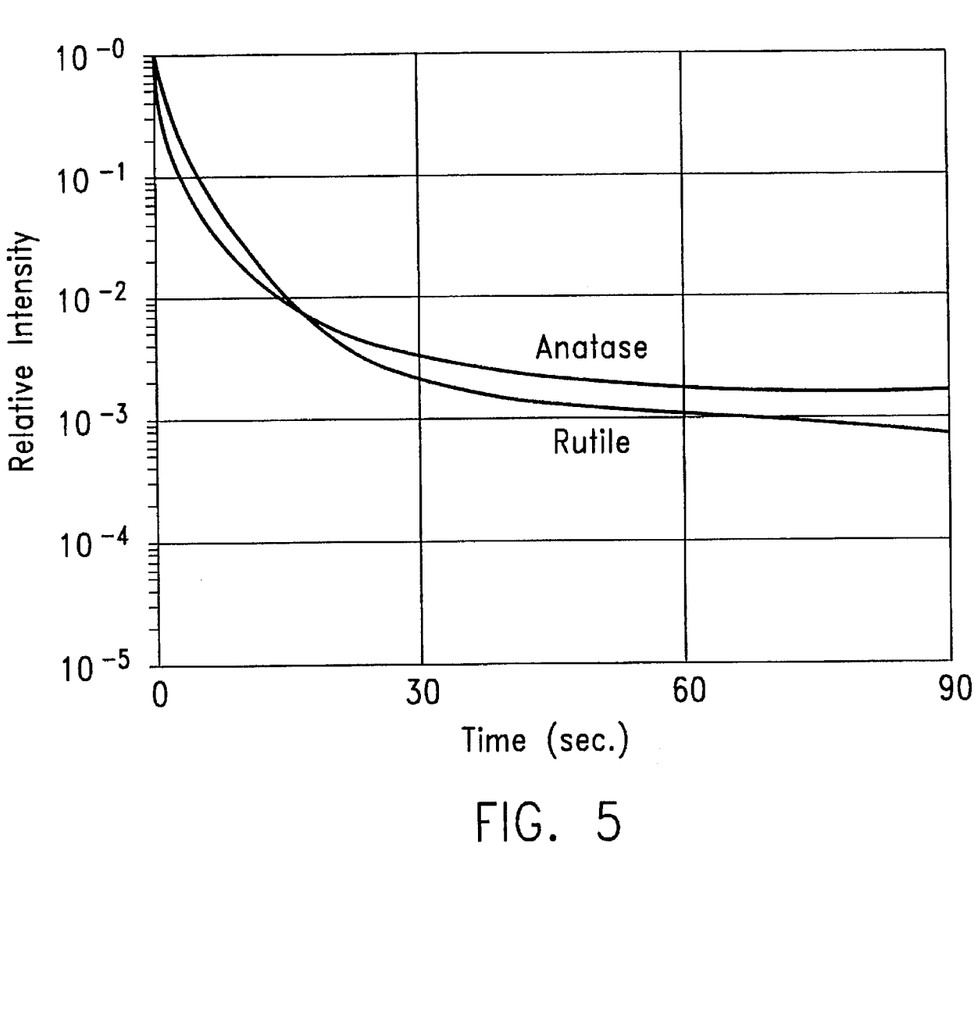
FIG. 5 shows the effect of the type of titanium oxide used, anatase vs. rutile, on the emission decay characteristics.

The raw material that is preferably used for providing the divalent metal element in the praseodymium-activated calcium titanate is a carbonate salt or an oxide of the divalent metal element. Preferably, whenever Zn is included, the zinc salts are used since they are relatively easy to use because of their reactivity, ease of handling and commercial availability in high purity. High purity $TiO_2$ may be used as the $TiO_2$ source for substantially the same reasons. Either form of titanium oxide, anatase or rutile, may be used. Anatase is the preferred source of the $TiO_2$. Although rutile gives a slight improvement in the initial brightness, the samples made using anatase give significantly higher phosphorescent emission at longer decay times as shown in is FIG. 5. Praseodymium oxide or oxalate salts are preferably used as the source of the rare earth activator.

The raw materials may be weighed and mixed by either a dry or wet mixing process in order to get a well blended and uniform raw material mixture. The wet mixture may be dried in an oven and sieved before firing. A small amount of flux may be added to the raw material mixture. While there are many fluxes known to one skilled in the art that may be used while still remaining within the scope of the subject invention, boric acid, calcium fluoride and ammonium tetrafluoroborate are herein disclosed to provide acceptable results. The boric acid may also be provided in the form of boric oxide. The fluxes tend to promote better and more complete reaction and improve the texture and morphology of the final phosphors. The boric acid used is preferably in the range of 3–10 mol % as compared to the total amount of calcium titanate produced. The use of boric acid may have a beneficial effect on brightness or decay depending on the presence of zinc in the composition. The calcium fluoride is also preferably used in the same range. The ammonium tetrafluoroborate may be used to shift the absorption edge of the phosphor so that it is sensitized by ambient light.

The mixture may be fired in a single step process in air or under mildly reducing conditions at 1100°–1400° C. for about 1–8 hours. The mixture may also be fired in a 2-step process wherein the first step is carried out under mildly reducing conditions and then the pre-fired product is re-fired a second time under oxidizing conditions. The mildly reducing conditions may be provided, for example, by firing in the presence of activated carbon. More specifically, the first step in the 2-step process may be carried out for about 1 to about 8 hours at about 1100° to about 1400° C. Preferably, the first step is carried out for about one hour at about 1350° C. The second step may be carried out for about 1 to about 4 hours at about 700° to about 1300° C. Preferably, the second step is carried out for about one hour at about 1000° C. The time schedule of the firing steps may be adjusted so as to optimize the decay properties. After firing, the fired material may then be pulverized and sieved and submitted for phosphorescent measurement using known methods.

Bismuth oxide may also be used as a suitable additive in the firing mixture. Although this material may adversely affect the long decay characteristics, it can give an initial improvement in brightness.

It is believed that the main crystal habit of the $CaTiO_3$ long decay phosphor is one having a perovskite structure. Preferably, the CaO and $TiO_2$ are present in a molar ratio of about 1:1. With increasing zinc concentration, peaks of $Zn_2TiO_4$ and $Ca_2Zn_4Ti_{15}O_{36}$ are observed. Accordingly, with higher concentrations of zinc, the resulting materials consist of a mixture of calcium titanate, zinc titanate and calcium zinc titanate. It is not clear if these complex phases have any effect on the brightness or decay characteristic of these phosphors.

Figure 6:
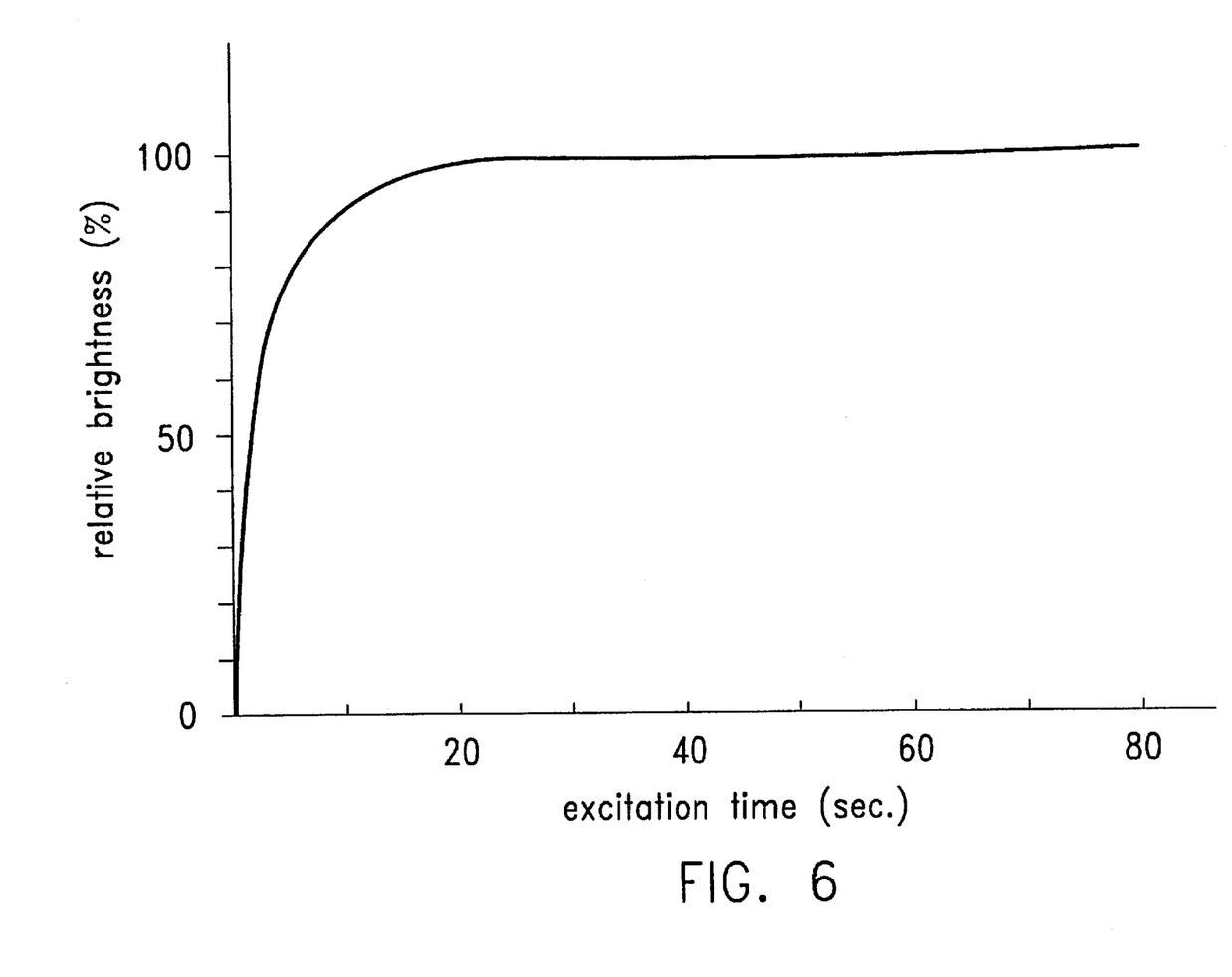
FIG. 6 shows the relative phosphorescent brightness as a function of varying the length of excitation time for the phosphor produced in Example 1.

These praseodymium-activated calcium titanates that may include the divalent metal elements Zn and/or Mg have red emission at about 614 nm and produce this red phosphorescence for at least about 10 minutes after removal of the excitation source of UV radiation at 365 nm. The length of time that the long decay phosphor is exposed to the excitation source may affect the relative phosphorescent brightness. FIG. 6 shows that the relative phosphorescent brightness time reached a maximum in less than about 30 seconds of excitation for the phosphor produced in Example 1.

Table I shows the color coordinates and brightness of some of the cited examples under UV radiation at 365 nm.

TABLE I

| Item | | Color Coordinates x/y | Relative Intensity (%) | |
|---|---|---|---|---|
| | | | with Boric Acid | no Boric Acid |
| $(Ca_{0.9}Pr_{0.001}Zn_{0.099})O \cdot TiO_2$ | (Ex. 1) | 0.671/0.325 | 16.0 | 19.7 |
| $(Ca_{0.9}Pr_{0.001}Mg_{0.099})O \cdot TiO_2$ | (Ex. 2) | 0.670/0.327 | 15.6 | 5.0 |
| $(Ca_{0.999}Pr_{0.001})O \cdot TiO_2$ | (Ex. 3) | 0.670/0.327 | 16.2 | 9.7 |
| $(Y_{0.964}Eu_{0.036})_2O_2S$ | | 0.652/0.339 | 100.0 | |

The thermostability and the stability in water were also tested. A sample of the phosphor of Example 1 was baked in air for 1 hour at 700° C. for testing thermostability. Another sample of the phosphor of Example 1 was stirred in water for 48 hours at room temperature and then dissolved material was measured. These tests showed these materials have relatively stable chemical compositions.

This invention will now be described in detail with respect to the specific preferred embodiments thereof, the materials and the process steps being understood as examples that are intended to be illustrative only. In particular, the invention is not intended to be limited to the materials, conditions, process parameters and the like recited herein.

EXAMPLES OF THE PREFERRED EMBODIMENTS

Example 1

A red emitting long decay phosphor having a composition $$(Ca_{0.9}Pr_{0.001}Zn_{0.099})O \cdot TiO_2$$

was prepared by starting with a mixture of:

| | |
|---|---|
| $CaCO_3$ | 90.08 g |
| $TiO_2$ | 79.90 g |
| $Pr_6O_{11}$ | 0.17 g |
| ZnO | 8.06 g |
| $H_3BO_3$ | 3.09 g. |

The mixture was fired in a furnace for 2 hours in air at 1300° C. After cooling, the product obtained was ground and sieved for evaluation.

The particle size, emission spectrum, color coordinates and decay characteristics under photoexcitation were measured using methods known to one skilled in the art. The particle size of this materials was about 24 μm and the emission peak was at about 614 nm.

Example 2

A red emitting long decay phosphor having a composition $Ca_{0.9}Pr_{0.001}Mg_{0.099})O \cdot TiO_2$ was prepared by starting with a mixture of:

| | |
|---|---|
| $CaCO_3$ | 90.08 g |
| $TiO_2$ | 79.90 g |
| $Pr_6O_{11}$ | 0.17 g |
| MgO | 3.99 g |
| $H_3BO_3$ | 3.09 g. |

The mixture was fired in a furnace for 2 hours in air at 1300° C. in a manner similar to that described in example 1. The particle size of this material was about 25 μm and the emission peak was observed at about 614 nm.

Example 3

A red emitting long decay phosphor having a composition $$(Ca_{0.999}Pr_{0.001})O.TiO_2$$

was prepared in a manner similar to that described in Example 1 by starting with a mixture of:

| | |
|---|---|
| CaCO3 | 99.999 g |
| $TiO_2$ | 79.90 g |
| $Pr_6O_{11}$ | 0.17 g |
| $H_3BO_3$ | 3.09 g. |

Example 4

A red emitting long decay phosphor having the composition of Example 3 was prepared using a 2-step firing process in which the mixture was fired in the presence of activated carbon for 4 hours at a temperature of about 1350° C. to produce a pre-fired product and then the pre-fired product was re-fired in air for 8 hours at a temperature of about 1000° C. The 2-step process used in this example are not necessarily optimum, but is disclosed to show that the long decay phosphors made according to this 2-step process were observed to show improvement with respect to the single-fired product.

What is claimed is:

1. A red emitting long decay phosphor comprising a composition of $$(Ca_{(1-a-b)}Pr_aM_b)O.TiO_2$$

wherein $0.00001 \leq a \leq 0.1$ and $0.0005 \leq b \leq 0.3$ and M is a divalent metal element selected from the group consisting of Zn, Mg and a combination thereof.

2. The long decay phosphor of claim 1 wherein M is zinc.

3. The long decay phosphor of claim 1 wherein M is magnesium.

4. The long decay phosphor of claim 1 wherein M is a combination of Zn and Mg.

5. The long decay phosphor of claim 1 wherein $0.000 \leq a \leq 0.01$.

6. The long decay phosphor of claim 1 wherein $0.0005 \leq b \leq 0.2$.

7. The long decay phosphor of claim 1 wherein said composition is:

$(Ca_{0.9}Pr_{0.001}Zn_{0.099})O.TiO_2$.

8. The long decay phosphor of claim 1 wherein said composition is:

$(Ca_{0.9}Pr_{0.001}Mg_{0.099})O \cdot TiO_2$.

9. The long decay phosphor of claim 1 wherein said composition is:

$(Ca_{0.9}Pr_{0.001}M_{0.009})O \cdot TiO_2$, wherein M is Mg or Zn.

10. A method of preparing a red emitting long decay phosphor comprising:

preparing a mixture comprising a component comprising calcium, a component comprising praseodymium, and a component comprising titanium and firing the mixture to produce a long decay phosphor having the composition $(Ca_{(1-a)}Pr_a)O \cdot TiO_2$ wherein $0.00001 \leq a \leq 0.1$ and wherein the firing step is carried out in a 2-step process comprising (a) firing under reducing conditions for 1–8 hours at a temperature of about 1100° to about 1400° C. to produce a fired product and (b) re-firing said fired product under oxidizing conditions for 1–4 hours at a temperature of about 700° to about 1300° C.

11. The method according to claim 10 wherein the long decay phosphor is capable of producing visually perceptible phosphorescence for at least 10 minutes after removal of an excitation source.

12. The method according to claim 11 wherein the excitation source produces UV radiation at about 365 nm.

13. The method according to claim 10 wherein the mixture includes a raw material selected from the group consisting of a component comprising Zn, a component comprising Mg and a combination of components thereof so as to produce a long decay phosphor having the composition:

$(Ca_{(1-a-b)}Pr_aM_b)O \cdot TiO_2$ wherein $0.0005 \leq b \leq 0.3$ and M is a divalent metal element selected from the group consisting of Zn, Mg and a combination thereof.

14. The method according to claim 10 wherein said firing step is carried out in the presence of a flux.

15. The method according to claim 14 wherein said flux comprises boric acid or boric oxide.

16. The method according to claim 15 wherein said boric acid or boric oxide is present in an amount corresponding to 3–10 mole % as compared to the total amount of calcium titanate produced.

17. The method according to claim 14 wherein said flux comprises calcium fluoride.

18. The method according to claim 17 wherein said calcium fluoride is present in an amount corresponding to 3–10 mole % as compared to the total amount of calcium titanate produced.

19. The method according to claim 14 wherein said flux comprises ammonium tetrafluoroborate.

20. The method according to claim 19 wherein said ammonium tetrafluoroborate is present in an amount corresponding to 3–10 mole % as compared to the total amount of calcium titanate produced.

21. The method according to claim 10 wherein the firing step under reducing conditions is carried out at a temperature of about 1350° C.

22. The method according to claim 10 wherein the firing step under oxidizing conditions is carried out at a temperature of about 1000° C.

23. The method according to claim 10 wherein the firing step under reducing conditions is carried out in the presence of activated carbon.

24. The method according to claim 10 wherein said component comprising titanium comprises anatase.

25. The method according to claim 10 wherein said component comprising titanium comprises rutile.

26. A method for producing long decay red phosphorescence comprising:

(a) preparing a long decay phosphor having the composition $(Ca_{(1-a-b)}Pr_aM_b)O \cdot TiO_2$, wherein $0.00001 \leq a \leq 0.1$ and $0.0005 \leq b \leq 0.3$, and M is a divalent metal element selected from the group consisting of Zn, Mg and a combination thereof; and (b) exciting said long decay phosphor with an excitation source so as to cause said long decay phosphor to produce visually perceptible phosphorescence for at least 10 minutes after removal of the excitation source.

27. The method according to claim 26 wherein said excitation source produces UV radiation at about 365 nm.

28. A method of preparing a red emitting long decay phosphor comprising:

preparing a mixture comprising a component comprising calcium, a component comprising praseodymium, a component comprising titanium and a raw material selected from the group consisting of a component comprising Zn, a component comprising Mg and a combination of components thereof and firing the mixture to produce a long decay phosphor having the composition $(Ca_{(1-a-b)}Pr_aM_b)O \cdot TiO_2$ wherein $0.00001 \leq a \leq 0.1$ and $0.0005 \leq b \leq 0.3$ and M is a divalent metal element selected from the group consisting of Zn, Mg and a combination thereof.

29. The method according to claim 20 wherein the long decay phosphor is capable of producing visually perceptible phosphorescence for at least 10 minutes after removal of an excitation source.

30. The method according to claim 29 wherein the excitation source produces UV radiation at about 365 nm.

31. The method according to claim 28 wherein said firing step is carried out in the presence of a flux.

32. The method according to claim 31 wherein said flux comprises boric acid or boric oxide.

33. The method according to claim 32 wherein said boric acid or boric oxide is present in an amount corresponding to 3–10 mole % as compared to the total amount of calcium titanate produced.

34. The method according to claim 31 wherein said flux comprises calcium fluoride.

35. The method according to claim 34 wherein said calcium fluoride is present in an amount corresponding to 3–10 mole as compared to the total amount of calcium titanate produced.

36. The method according to claim 31 wherein said flux comprises ammonium tetrafluoroborate.

37. The method according to claim 36 wherein said ammonium tetrafluoroborate is present in an amount corresponding to 3–10 mole % as compared to the total amount of calcium titanate produced.

38. The method according to claim 28 wherein the firing step is carried out in a 2-step process comprising
    (a) firing under reducing conditions for 1–8 hours at a temperature of about 1100° to about 1400° C. to produce a fired product and
    (b) re-firing said fired product under oxidizing conditions for 1–4 hours at a temperature of about 700° to about 1300° C.

39. The method according to claim 38 wherein the firing step under reducing conditions is carried out at a temperature of about 1350° C.

40. The method according to claim 38 wherein the firing step under oxidizing conditions is carried out at a temperature of about 1000° C.

41. The method according to claim 38 wherein the firing step under reducing conditions is carried out in the presence of activated carbon.

42. The method according to claim 28 wherein said component comprising titanium comprises anatase.

43. The method according to claim 28 wherein said component comprising titanium comprises rutile.

* * * * *